United States Patent
Yin et al.

(10) Patent No.: US 7,899,848 B2
(45) Date of Patent: Mar. 1, 2011

(54) METHODS TO MODEL NIC TEAMING AND LOAD BALANCING

(75) Inventors: Jianwen Yin, Round Rock, TX (US); Wei Liu, Austin, TX (US); Lei Wang, Austin, TX (US)

(73) Assignee: Dell Products L.P., Round Rock, TX (US)

(*) Notice: Subject to any disclaimer, the term of this patent is extended or adjusted under 35 U.S.C. 154(b) by 119 days.

(21) Appl. No.: 11/558,916

(22) Filed: Nov. 12, 2006

(65) Prior Publication Data
US 2008/0114781 A1    May 15, 2008

(51) Int. Cl.
*G06F 7/00* (2006.01)
(52) U.S. Cl. .............. 707/810; 707/797; 707/803; 707/805; 707/828; 707/831
(58) Field of Classification Search .......... 707/10, 707/102, 103 Y, 797, 803, 805, 810, 828, 707/831; 711/115; 463/42, 43; 726/17; 709/223, 224, 250; 370/254, 235, 241
See application file for complete search history.

(56) References Cited

U.S. PATENT DOCUMENTS

| | | | | |
|---|---|---|---|---|
| 5,590,306 A * | 12/1996 | Watanabe et al. | ........... | 711/115 |
| 6,666,770 B1 * | 12/2003 | Kubo et al. | .................... | 463/43 |
| 7,032,243 B2 * | 4/2006 | Leerssen et al. | ................ | 726/17 |
| 7,162,509 B2 * | 1/2007 | Brown et al. | ................ | 709/201 |
| 7,305,461 B2 * | 12/2007 | Ullman | ....................... | 709/223 |
| 7,426,189 B2 * | 9/2008 | McGee et al. | ................ | 370/254 |
| 7,478,173 B1 * | 1/2009 | Delco | ......................... | 709/250 |
| 2002/0078383 A1 * | 6/2002 | Leerssen et al. | ............. | 713/201 |
| 2002/0188875 A1 | 12/2002 | Hwang et al. | | |
| 2002/0194251 A1 * | 12/2002 | Richter et al. | ................ | 709/105 |
| 2005/0038878 A1 | 2/2005 | McGee et al. | | |
| 2006/0018263 A1 * | 1/2006 | McGee et al. | ................ | 370/241 |
| 2006/0121988 A1 * | 6/2006 | Reville et al. | ................. | 463/42 |
| 2006/0184536 A1 * | 8/2006 | Jreij et al. | ...................... | 707/10 |
| 2006/0248187 A1 * | 11/2006 | Thorpe et al. | ............... | 709/224 |
| 2008/0101230 A1 * | 5/2008 | Liu et al. | ..................... | 370/235 |

OTHER PUBLICATIONS

Jiantao Kong et al., "KStreams: Kernel Support for Efficient Data Streaming in Proxy Servers", ACM, 2005, pp. 159-164.*

* cited by examiner

*Primary Examiner*—Thuy N Pardo
(74) *Attorney, Agent, or Firm*—Garrana Tran LLP; Andrea E. Tran (57) ABSTRACT

A computer-implemented method disclosed may include providing a plurality of classes to represent at least one attribute of a NIC team, providing at least one association class to represent the relationship between each of the plurality of classes and associating each of the plurality of classes with the at least one association class.

13 Claims, 9 Drawing Sheets

METHODS TO MODEL NIC TEAMING AND LOAD BALANCING

BACKGROUND

1. Technical Field

The present disclosure relates generally to information handling systems and, more particularly, to modeling the teaming of network interface controllers (NICs).

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The complexity of managing information handling systems is increasing as the size, capabilities, and diversity of computer systems and networks increase. As a tool for managing information handling systems, the Common Information Model (CIM) established by the Distributed Management Task Force (DMTF), is a standard that defines interrelated managed elements in an IT environment represented as a common set of objects. DMTF is a not-for-profit, vendor-neutral collaborative body, which is leading the development, adoption and unification of management standards and initiatives for desktop, enterprise and Internet environments. DMTF is chartered to adopt create and maintain the specifications and technologies that provide management tools which deploy, discover and control management data in a standardized way. CIM is an information model, a conceptual view of the managed environment, which attempts to unify and extend the existing instrumentation and management standards using object-oriented constructs and design. At its core, CIM is comprised of a specification and schema. The CIM specification defines the details for integration with other management models, while the CIM schema provides the actual model descriptions. This schema defines how the managed elements in an IT environment are represented as a common set of objects and relationships between them. The underlying CIM framework, including basic model classes and associations, may be built upon through the use of CIM extensions which may be platform and/or technology specific.

The present disclosure provides a number of extensions to the existing CIM, specifically, several CIM classes and association classes to model NIC teaming and network traffic load balancing. Network interface controllers (NICs) provide physical connections to allow information handling systems (IHSs) to communicate over a network. NIC teaming is a network technology that allows multiple NICs in a system to be grouped together to provide network traffic load balancing, fault tolerance and link aggregation. The teaming functionality may be provided through the intermediate driver in Windows and the operating system (OS) built-in support within Linux through channel bonding. In Windows, NIC teaming may utilize the intermediate driver to group physical controllers into a team acting as a single virtual adapter or controller.

Multiple Vendor Teaming (MVT) may not always be supported under Windows, particularly in the case where the teaming feature uses proprietary intermediate drivers. In the Distributed Management Task Force (DMTF) System Management Work Group (SMWG), there are four profiles designed to model NIC related components and functionalities including Ethernet Port/Network Port Profile, IP Interface Profile, DHCP Client Profile and DNS Client Profile. However, no current profile relates to NIC teaming, therefore resulting in a lack of standard across multiple vendors in NIC teaming.

The problem with MVT may also exist with regard to non-proprietary features. For example, Receive Side Scaling (RSS) is another advanced feature to support the balancing of received network traffic using multiple receive buffers, Deferred Procedure Queues, and logic CPUs with the introduction of hyper-threading technology (HIT) and multi-core OPUs. When the NICs are teamed together with different RSS settings the entire team may normally function with RSS disabled even if only one NIC has RSS disabled. There is no way for the teaming model to detect the current advanced feature settings of the team and intelligently change those settings to take advantage the advance features of all the members in a NIC team.

As another example, different vendors may offer different teaming algorithms. Therefore, and there is no standard or policy to dynamically adjust and apply different algorithms for different situations to optimize an algorithm for a particular situation.

The development of a standard NIC teaming protocol may allow for the teaming of NICs from different vendors. Consequently, such a standard may permit the realization of performance gains and the utitization of advanced features from the different vendors in a NIC team.

SUMMARY

The following presents a general summary of some of the many possible embodiments of this disclosure in order to provide a basic understanding of this disclosure. This summary is not an extensive overview of all embodiments of this disclosure. This summary is not intended to identify key or critical elements of the disclosure or to delineate or otherwise limit the scope of the claims. The following summary merely presents some concepts of the disclosure in a general form as a prelude to the more detailed description that follows.

A computer-implemented method to model NIC teaming is disclosed. The method may include providing a plurality of classes to represent at least one attribute of a NIC team and providing at least one association class to represent the relationship between each of the plurality of classes. The method may also include associating each of the plurality of classes with the at least one association class.

Also disclosed is data structure embodied in a computer-readable medium. The data structure may include a first field comprising data representing a property and a method for a NIC team, a second field comprising data representing a policy for the NIC team of the first field, a third field comprising data representing an association class for creating the NIC team of the first field and a fourth field comprising data representing a relationship between the first and second fields.

Furthermore, the present disclosure provides for a computer-implemented method for managing load balance within a NIC team. The method may include monitoring network traffic toad for a NIC team, selecting a load balance algorithm in accordance with the network traffic load to produce a load balancing policy and implementing the load balancing policy.

A computer-implemented method for managing members in a NIC team is also disclosed. The method may include creating the NIC team, in the case where the NIC team does not already exist, establishing a number of members in the NIC team and confirming the operability of advanced features on at least one NIC of the NIC team.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price, The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Portions of the present disclosure, detailed description and claims may be presented in terms of logic, software or software implemented aspects typically encoded on a variety of media including, but not limited too, computer-readable media, machine readable media, program storage media or computer program product. Such media may be handled, read, sensed and/or interpreted by an information handling system (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure. Embodied on a computer-readable medium may be a data structure. As used herein, a data structure may be a physical or logical relationship containing data elements and/or information.

Figure 1:
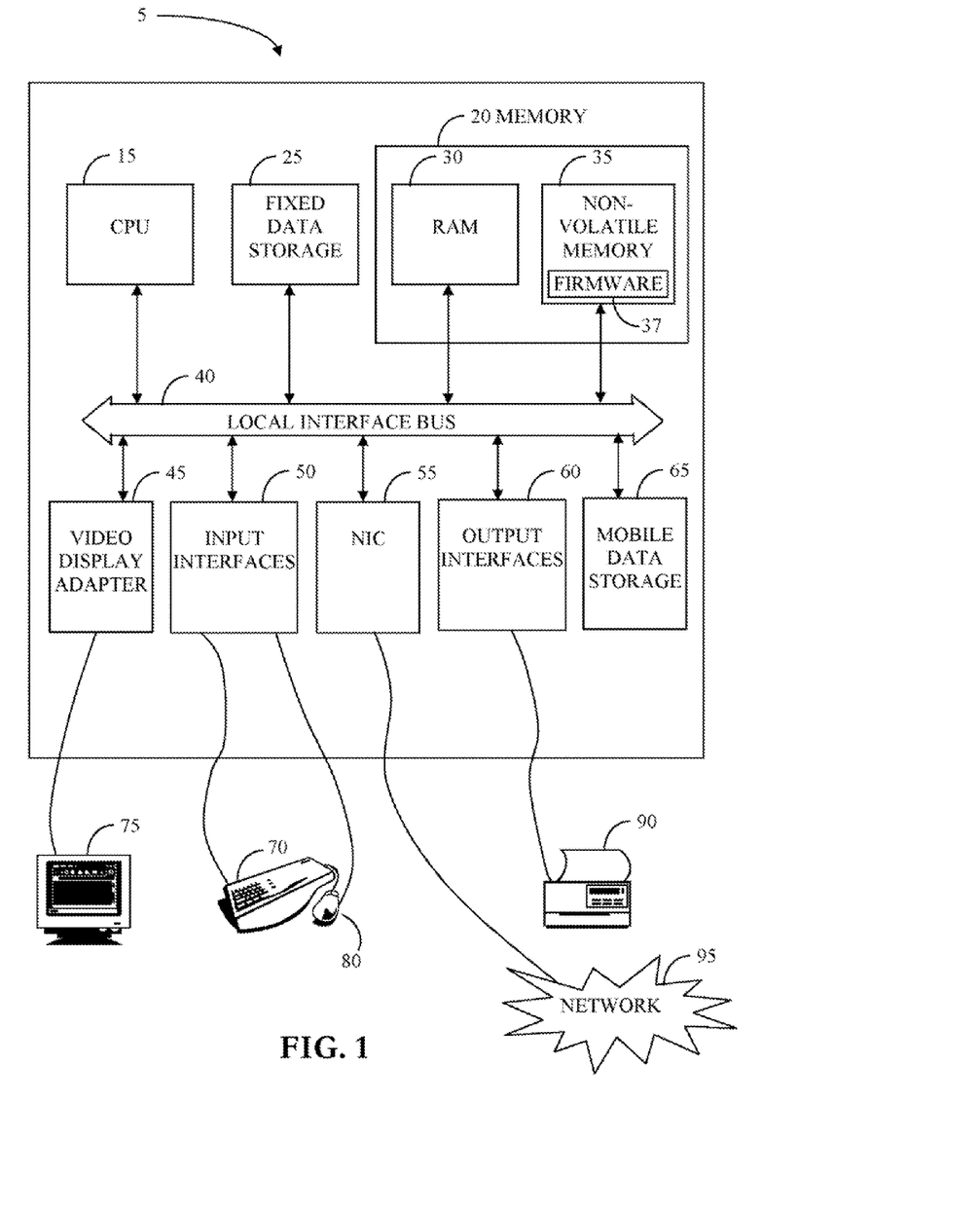
FIG. 1 schematically depicts an embodiment of an information handling system (IHS).

FIG. 1 illustrates a non-limiting embodiment of an information handling system 5 comprising a CPU 15. It should be understood that this disclosure has applicability to information handling systems as broadly described above, and is not intended to be limited to IHS 5 as specifically described. The CPU 15 may comprise a processor, a microprocessor, mini-computer, or any other suitable device, including combinations and/or a plurality thereof for executing programmed instructions. The CPU 15 may be in data communication over a local interface bus 40 with components including a fixed data storage 25, mobile data storage device 65 and memory 20.

The memory 20, as illustrated in FIG. 1 may include a non-volatile memory 35 having a firmware program 37 optionally stored therein, such as an initialization start-up program. The non-volatile memory 35 includes, but is not limited to, flash memory and electrically erasable programmable read-only memory (EEPROM). The firmware program 37 may contain, programming and/or executable instructions required to control a keyboard 70, a display monitor 75, a mouse 80, a mobile data storage 66, other input/output devices not shown here, and a number of miscellaneous functions and/or devices. The memory 20 may also comprise a random access memory (RAM) 30. The OS and application programs may be loaded into RAM 30 for execution.

The IHS 5 may further comprise a video display adapter 45, a plurality of input interfaces 50, a network interface controller (NIC) 55, and a plurality of output interfaces 60. Output interface 60 may transmit data to a number of devices, including a printer 90 for printing.

The IHS 5 may be coupled to a network 95 through a network interface controller (NIC) 55 thus allowing the IHS 5 to send and receive data via the network 95 to and from a remote device. A NIC 55 may allow multiple information handling systems to communicate over a network 95 such as a local area network (LAN). As used herein, a network interface controller may also be referred to as a network interface card or network adapter. The NIC 50 may be an Ethernet controller, however, those skilled in the art will appreciate that a plurality of brands or types of controllers, cards and/or adapters may be utilized.

Figure 2:
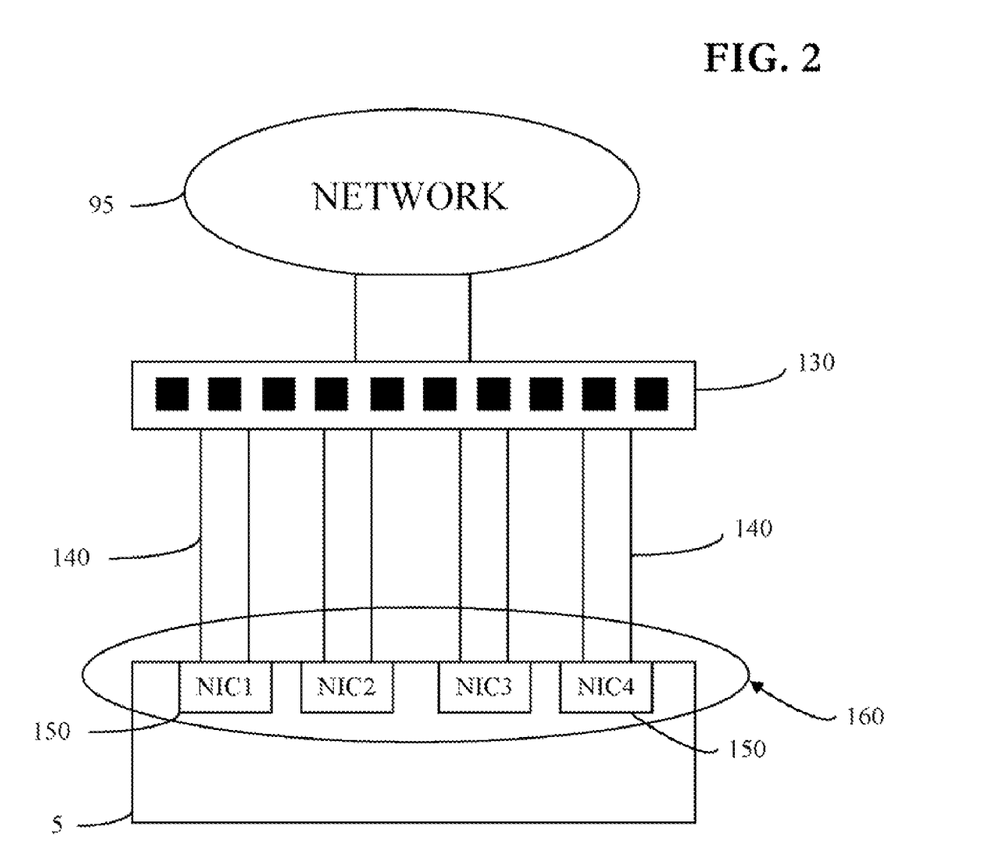
FIG. 2 schematically depicts a NIC team within an IHS.

Referring to FIG. 2, a network interface controller (NIC) team 160 within an IHS 5 is illustrated, in accordance with one embodiment of the present disclosure. As used herein, a "NIC team" may refer to a grouping of two or more physical NICs 55 into a single virtual interface or single logical network device (not shown). In alternative embodiments, a NIC team 160 may be operable as an Ethernet trunk, port team, port trunk. NIC bond and link aggregate group (LAG) and may be based on one or more of the IEEE 802 networking standards and/or protocols. Individual NICs 55 or a NIC team 160 generally operate to receive network traffic load 140 in the form of network data and/or packets. In one embodiment, network traffic load 140 may be bidirectional and incoming toward the NICs 55 or outgoing toward the network 95. Continuing with FIG. 2, a standard interface 130 may provide for modeling and managing NIC teaming. The interface 130 may also provide for modeling load balancing within the NIC team.

Figure 3:
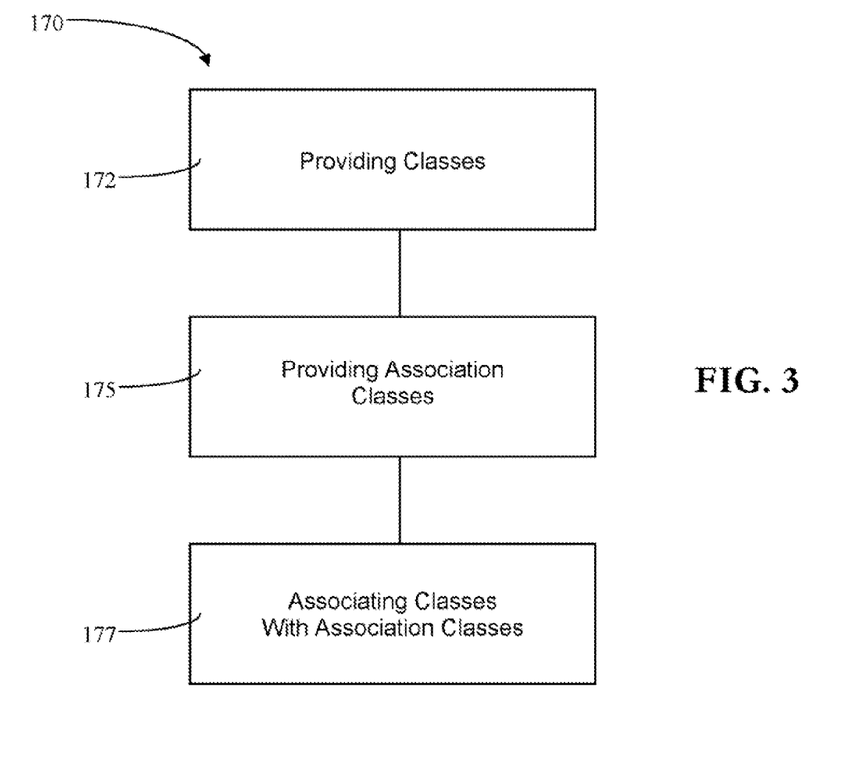
FIG. 3 is a flowchart illustrating a method according to the present disclosure.

FIG. 3 illustrates a flowchart depicting a method 170 of the present disclosure. The method may provide step 172 for providing a plurality of classes related to NIC teaming. Each class may represent at least one attribute of a NIC team. An attribute may present a characteristic or an action taken by a class. An attribute of a class may include, but is not limited to a property, a method, a policy or combinations of two or more of the foregoing. Examples of properties may include name, identifier (ID), team address, team members, teaming mode, operating system, advanced features support and advanced features enable status. It is understand that a property of a class may also include any combinations of the properties mentioned. Furthermore, methods may include creating a team, deleting a team, setting teaming mode, changing teaming mode, getting team statistics, setting team advanced features and any combinations of the foregoing. Non-limiting examples of policies include balanced load, priority based load or other load balance algorithm. In the case of a balanced load, the network traffic load in a NIC team may be distributed to each member of the NIC team. The amount of traffic may be evenly or unevenly distributed to each member of the NIC team. A priority based load may be characterized by network traffic load being assigned to one or a subset of NIC team members based on a type of priority. The priority may include, but is not limited to, a user-defined parameter or a predetermined level.

Continuing with FIG. 3, the method 170 may also include step 152 of providing at least one association class. The association class may represent a relationship between one or more classes provided in step 175. An association class may also include the creation of a NIC team. The method 170 may further include step 177 of associating a class with an association class.

Figure 4:
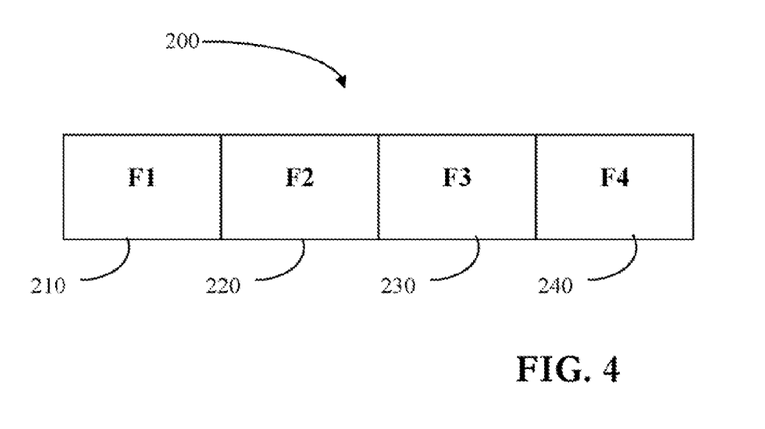
FIG. 4 schematically depicts a data structure according to an embodiment of the present disclosure.

Shown in FIG. 4 is a data structure 200 embodied on a computer-readable medium according to an embodiment of the present disclosure. The data structure 200 comprises fields of data representing classes and association classes. In one embodiment, the data structure 200 may represent CIM classes to model various aspects of NIC teaming. Field 210 may comprise data representing NIC team related properties and methods. The data structure 200 may also include field 220 comprising data representing the policy for NIC teaming and field 230 comprising data representing an association class related to the teaming of NICs. The data structure 200 may further include field 240 containing data representing the relationship between fields 210 and 220.

Figure 5:
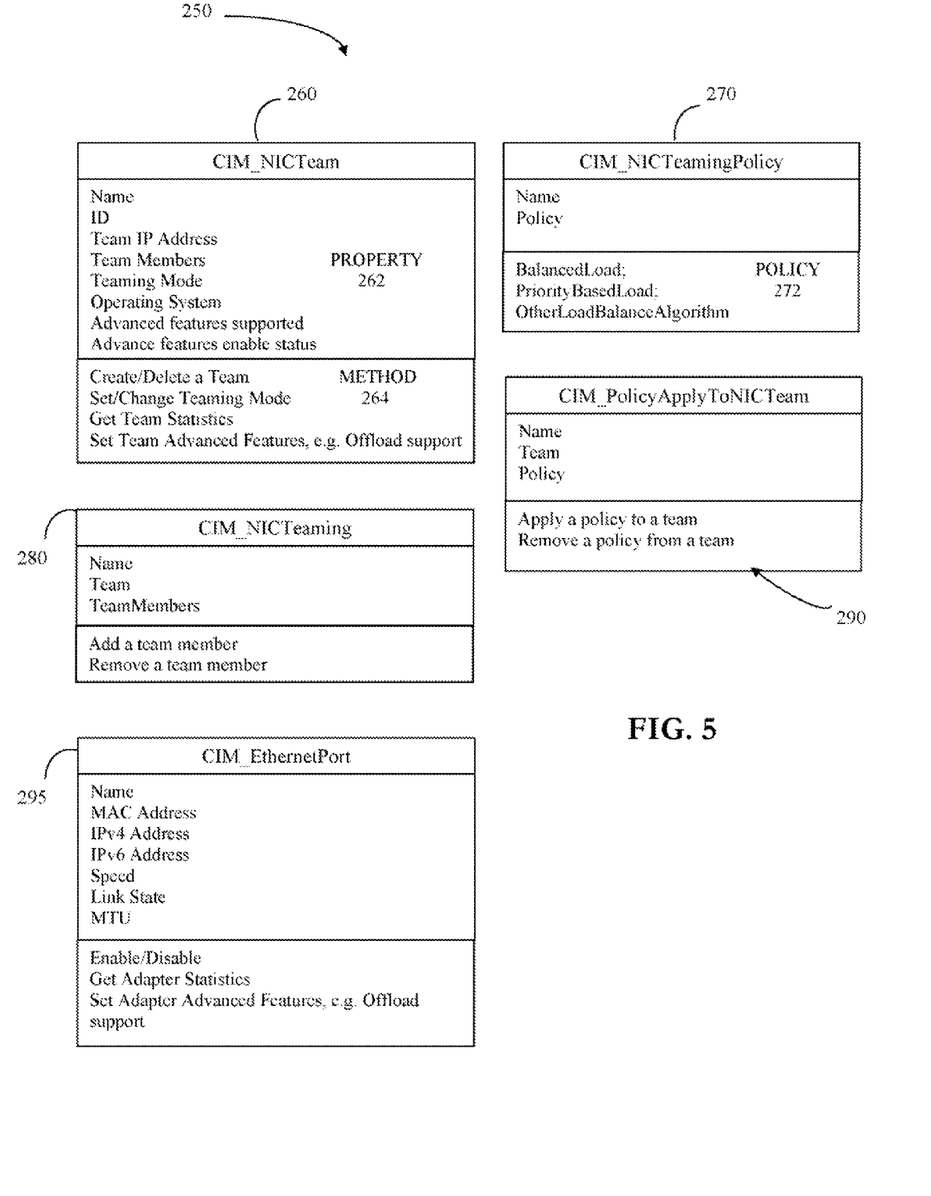
FIG. 5 is a block diagram of illustrative Common Information Model (CIM) classes related to NIC teaming.

Referring now to FIG. 5, a block diagram of CIM classes 250 related to NIC teaming will be discussed briefly. Class 260 may correspond to modeling a property 262 and a method 264 related to a NIC team. FIG. 5 depicts the class 260 named as CIM_NICTeam. As seen herein, the present disclosure provides new extensions to the existing CIM and various embodiments of this disclosure provide specific names for the new extensions. However, it should be understood that the names of extensions and/or classes utilized herein were arbitrarily selected within the rules of the existing CIM. Classes and/or extensions included in the present disclosure are not intended to be limited to particular names. Rather, focus is to be directed to the function, characteristics and operation of the extension, with the understanding that any name may be utilized. Continuing with FIG. 5, data in the CIM_NICTeam property 262 may denote a characteristic of the CIM_NICTeam class. As depicted, a property 262 may include, but is not limited to, name, identifier (ID), team IP address, team members, teaming mode, operating system (OS), advanced features supported, advanced features enable status or any combination of two or more of the foregoing. Examples of advanced features related to NICs may include Multiple Vendor Teaming (MVT) and Receive Side Scaling (RSS). MVT may support the teaming of NICs from multiple vendors while RSS is an advanced feature to support the balancing of received network traffic load. Alternatively, the CIM_NICTeam method 264 may correspond to an action denoting a behavior of the class. Examples of a method 264 may include creating a team, deleting a team, setting teaming mode, changing teaming mode, receiving team statistics, setting team advanced features or any combination of two or more of the foregoing. One of skill in the art should recognize that the properties and methods given are illustrative and are not intended to constitute a complete list of all possible properties and methods covered by the present disclosure.

As a new extension to CIM, FIG. 5 also illustrates class 270 to model the policy for NIC teaming. Class 270 is named CIM_NICTeamingPolicy in the figure provided, however, as previously stated, such name is arbitrarily selected and is not intended to limit the scope of the specification and claims of the present disclosure. A policy 272 related to NIC teaming describing attributes of network traffic load may include, as examples, balanced load, priority based load and other load balance algorithm. It is understood that examples of a policy 272 provided are merely illustrative and do not include a complete list of all possible policies for a NIC team.

FIG. 5 also depicts another extension to the CIM schema, the association class 280 related to teaming NICs together. As used herein, an association class may represent a relationship between two or more classes within a CIM schema. For purposes of the present disclosure, the association class 280 is named CIM_NICTeaming, however, the present disclosure is not meant to be limited to the name selected. The association class 280 may provide for adding a team member and removing a team member. In one aspect, CIM_NICTeaming may provide an association between the CIM_BICTeam and an existing CIM_EthernetPort class. The CIM_EthernetPort class may exhibit characteristics such as name, MAC address, IPv4 address. IPv6 address, speed, link state and MTU and the class may relate to enabling a NIC port, disabling a NIC port, receiving NIC statistics, setting NIC advanced features or any combination of any two or more of the foregoing.

As still another extension to CIM, the present disclosure provides a class 290 representing a relationship between classes 260 and 270. For purposes of the present disclosure, class 290 is given the illustrative name CIM_PolicyApplyToNICTeam.

Figure 6:
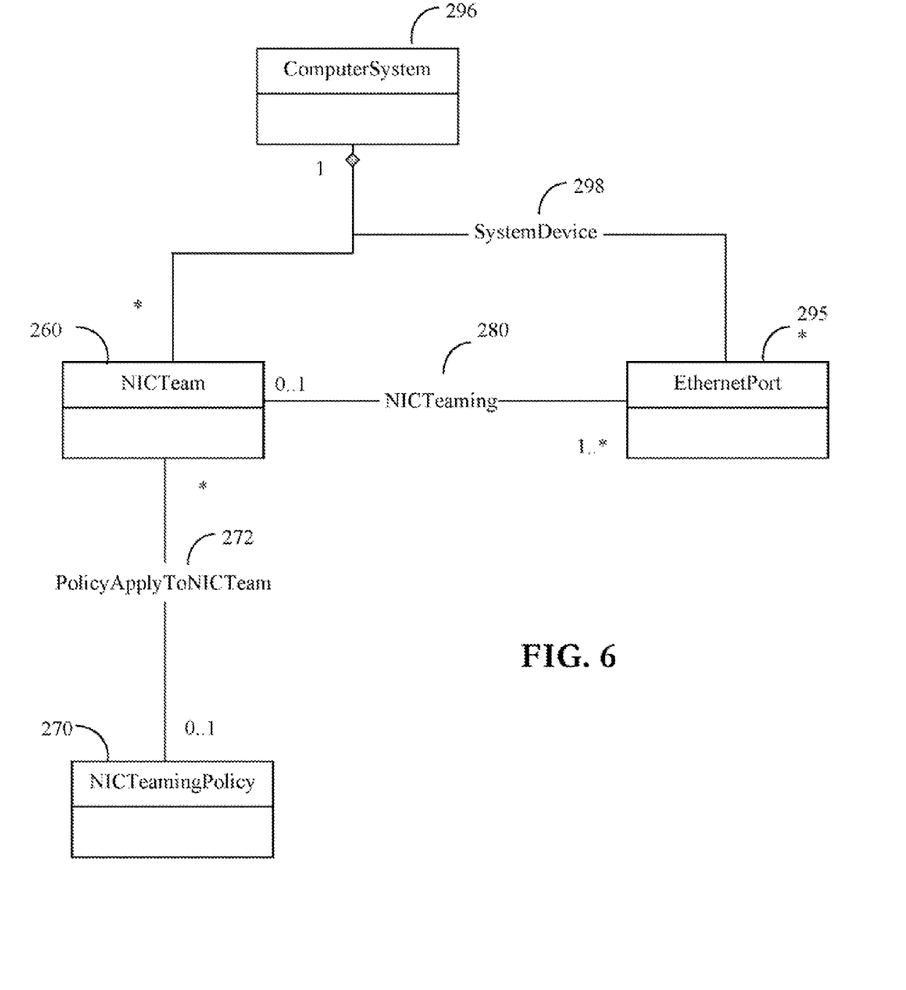
FIG. 6 a block diagram depicting an embodiment of associations of CIM classes related to NIC teaming.

FIG. 6 schematically illustrates the relationships among CIM classes and association classes related to NIC teaming. As shown, an existing CIM class, ComputerSystem 270 may be related to class 210 named CIM_NICTeam through an existing association class SystemDevice 280. Also, ComputerSystem 270 may be related to class 250 named CIM_EthernetPort through the association class SystemDevice 280. As shown in FIG. 6, a relationship may exist between class 210 named CIM_NICTeam and class 260 named CIM_EthernetPort through the association class 230 named CIM_NICTeaming. In one embodiment, CIM_NICTeaming may provide for the addition of a team member through the enabling of a NIC port within CIM_EthernetPort. In another non-limiting embodiment, CIM_NICTeaming may provide for the removal of a team member through the disabling of a NIC port within CIM_EthernetPort. Also shown is the relationship between class 210 named CIM_NICTeam and class 220 named CIM_NICTeamingPolicy through the association class 240 named CIM_PolicyApplyToNICTeam. According to one aspect, CIM_PolicyApplyToNICTeam may provide for applying a policy to a NIC team or removing a policy from a NIC team. In embodiments of the present disclosure, CIM_PolicyApplyToNICTeam may relate to applying a balanced load, priority based load or other load balance algorithm of CIM_NICTeamingPolicy to CIM_NICTeam. In alternative embodiments, CIM_PolicyApplyToNICTeam may relate to removing a balanced load, priority based load or other load balance algorithm of CIM_NICTeamingPolicy from CIM_NICTeam. As illustrated, asterisks and numbers from 0 to 1 indicate the range of commonality among the classes (e.g. 0 indicating zero, 1 indicating one and * indicating multiple). For example, in the relationship between ComputerSystem 5 and class 210 representing CIM_NICTeam, there may exist multiple NIC teams for a single computer system.

Figure 7:
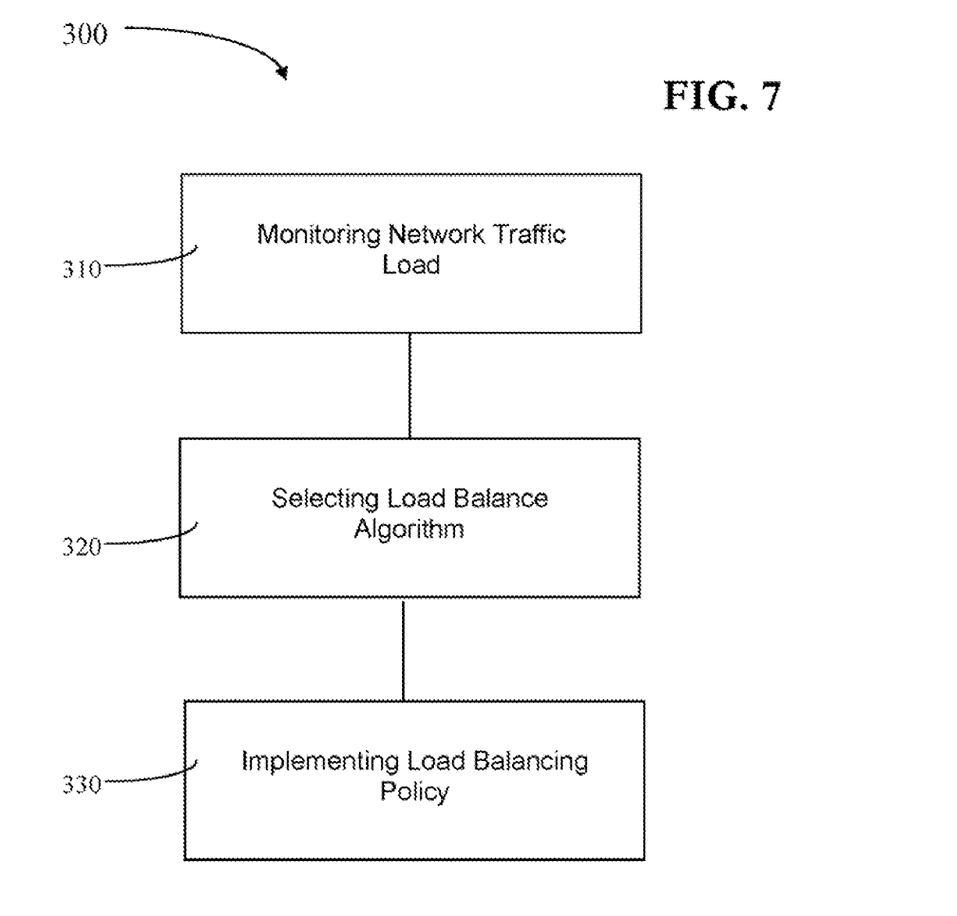
FIG. 7 is a flowchart illustrating an embodiment of a method for managing load balance within a NIC team.

In FIG. 7, a flowchart of a method 300 is depicted according to an aspect of the present disclosure. The method 300 may include any one or more of the following steps as shown. The method in FIG. 6 begins with the step 310 of monitoring network traffic load for a NIC team. The method 300 may also include the step 320 of selecting a load balance algorithm in accordance with the network traffic load to produce a load balance policy. An IHS may be configured by a user to select an efficient load balance policy by choosing from a load balance policy pool any algorithm based on the network traffic. It is understood that a different load balance policy may be applied in different situations. In accordance with one embodiment of the present disclosure, within the class CIM_NICTeamingPolicy, the load balancing policy may be the result of selecting a balanced load algorithm, priority based load algorithm or other load balance algorithm. The method 300 may further include the step 330 of implementing the load balancing policy.

Figure 8:
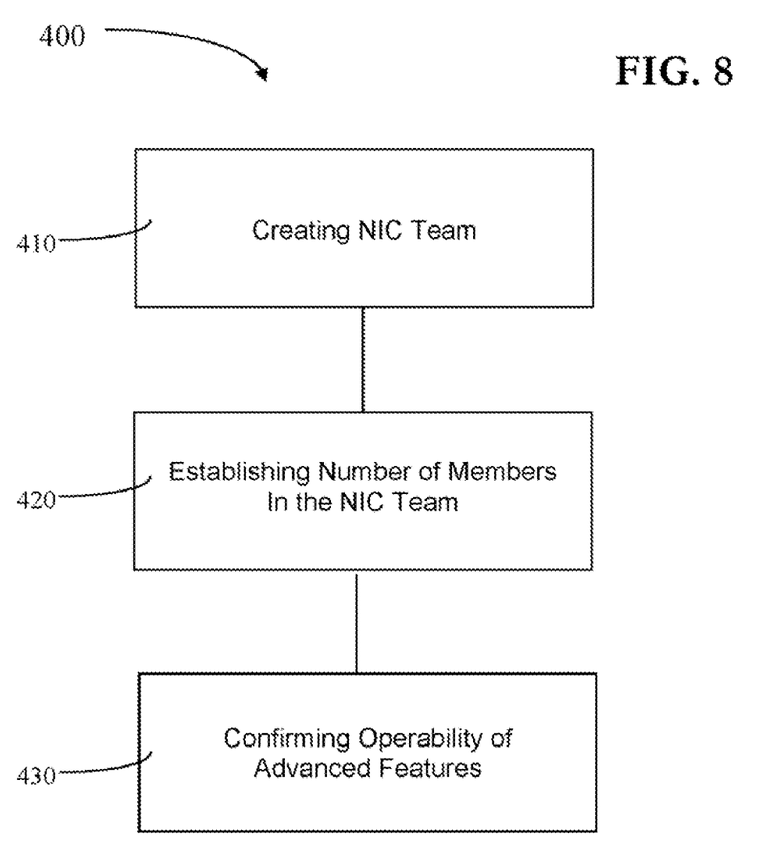
FIG. 8 is a flowchart illustrating an embodiment of a method for managing members in a NIC team.

Shown in FIG. 8 is a flowchart illustrating a computer-implemented method 400 for managing members in a NIC team. The method 400 include may include step 410 of creating the NIC team, in the case where the NIC team does not already exist. For systems in which a NIC team already exists, step 410 is not required. The method 400 may also include the step 420 of establishing a number of members in the NIC team. In one embodiment, the step 420 of establishing a number of members in the NIC team may include deleting at least one NIC from the NIC team. Removing at least one network port to which a NIC is attached may be a method utilized to delete at least one NIC from a team. In an alternative embodiment, the step 420 of establishing a number of members in the NIC team may include adding at least one NIC from the NIC team. Adding at least one network port to which a NIC is attached may be a method utilized to add at least one NIC to a team. The method 400 may further include step 430 of confirming the operability of advanced features on at least one NIC of the NIC team. Confirming the operability of advanced features may include, but is not limited to, determining if advanced features are supported on NIC team members and enabling the advanced features on NIC team members.

Figure 9:
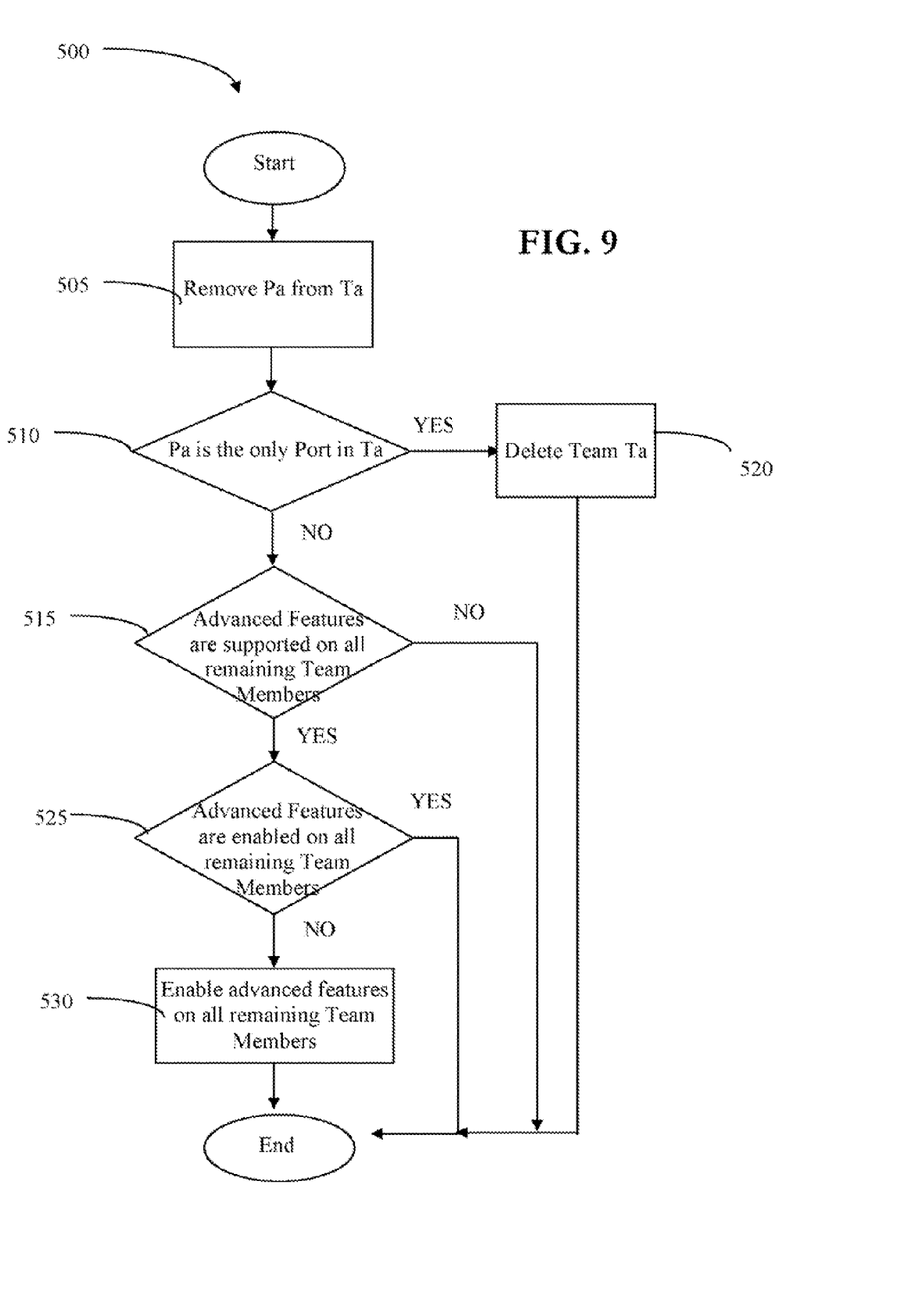
FIG. 9 is a flowchart illustrating a method for deleting a member from a NIC team.

FIG. 9 is set forth, for the purpose of explanation and not limitation, to provide a thorough understanding of a method 500 for removing a network port from a NIC team and confirming the operability of advanced features. Step 505 is the action of removing a network port (Pa) from a NIC team (Ta). In step 510, it is determined whether Pa is the only port in the NIC team. If Pa is the only port, the step 520 of deleting the team Pa is taken and the method 500 ends. If Pa is not the only port, the method 500 proceeds to step 515 in which there is a determination of whether advanced features are supported on all the remaining NIC team members. In the case where the advanced NIC features are not supported on the remaining members, the method 500 ends. If the advanced NIC features are supported on the remaining members, the method 500 continues to step 525 where there is a further determination of whether advanced features are enabled on all remaining NIC team members. In the event advanced features are already enabled on the remaining members, the method 500 ends, if the advanced features are not enabled on the remaining members, the step 530 takes an action to enable advanced features on all remaining team members. Following step 530, the method 500 ends.

Figure 10:
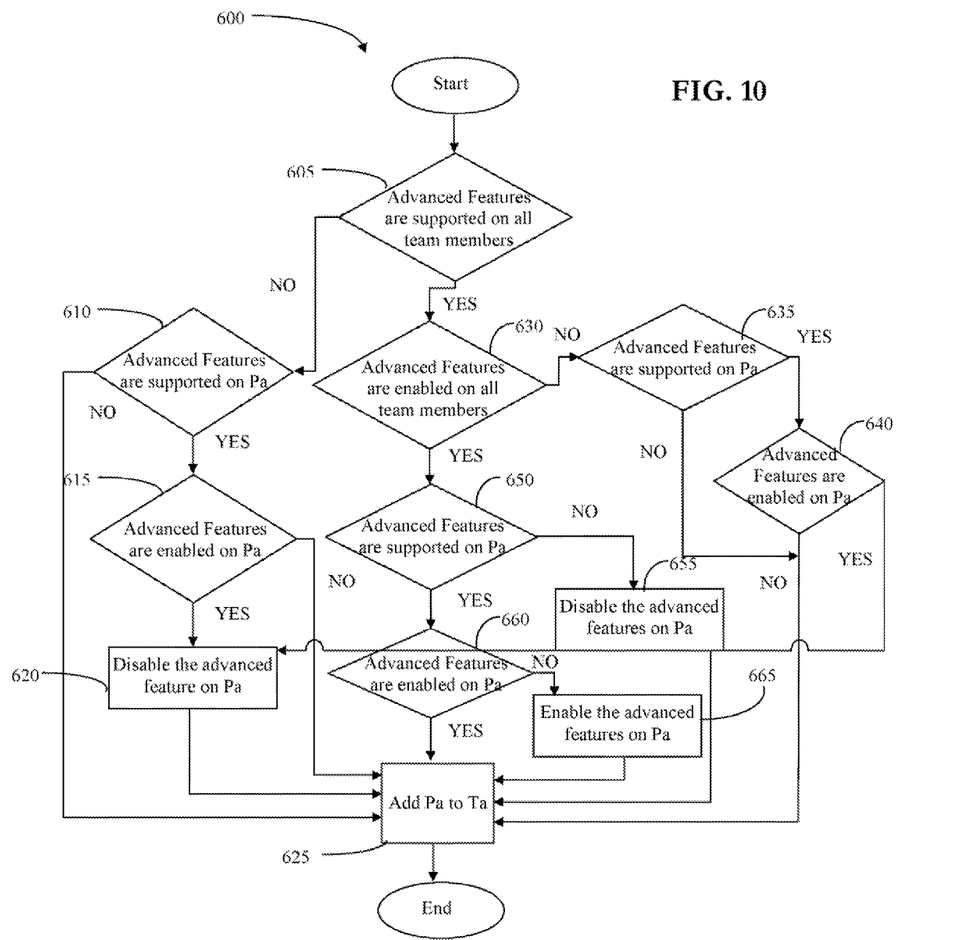
FIG. 10 is a flowchart illustrating a method for adding a port to a NIC team.

FIG. 10 illustrates a non-limiting embodiment of a method 600 for adding a network port (Pa) to a NIC team (Ta) and confirming the operability of advanced features on NIC team members. The method 600 may include any one or more of the following steps as shown. In step 605, it is determined whether advanced features are supported on all team members. If advanced features are not supported, the method 600 may proceed to step 610. In step 610, there is a determination of whether advanced features are supported on Pa. In the case where advanced features are not supported on Pa, the method 600 proceeds to step 626 of adding Pa to Ta. In this and all subsequent steps, whenever the step 625 of adding Pa to Ta is reached, the method 600 ends. Still referring to FIG. 9, if in step 610 it is determined that advanced features are supported on Pa, the method 600 may proceed to step 615. As seen in step 615, if advanced features are not enabled on Pa, step 625 follows with the addition of Pa to Ta. However, if the advanced features are not enabled on Pa in step 615, the step 620 of disabling the advanced feature on Pa.

Continuing with FIG. 10, if in step 605 it is determined that advanced features are supported on all team members, the method 600 may proceed to step 630. In step 630, a determination may be made with regard to whether advanced feature are enabled on all team members. In the case where advanced features are not enabled on all team members, there may be a check on whether advanced features are supported on Pa (step 6365) If the features are not supported, Pa is added to Ta (step 625) and the method ends. If the advanced features are supported, the features are enabled on Pa (step 640) and Pa is added to Ta (step 625). Referring back to step 630 of FIG. 10, if advanced features are enabled on all team members, in step 650 it may be determined if advanced features are supported on Pa. If advanced features are not supported, in step 655, the features are disabled on Pa. Otherwise, if advanced features are supported on Pa, there may be a determination of whether advanced features are enabled on Pa (step 660). If the features are enabled, Pa may be added to Ta (step 625). In the event features are not enabled, according to step 666, the features are enabled on Pa and Pa may be added to Ta (step 625).

While various embodiments have been shown and described, various modifications and substitutions may be made thereto without departing from the spirit and scope of the invention. Accordingly, it Is to be understood that the present invention has been described by way of illustrations and not limitation,

What is claimed is:

1. A computer-implemented method to model network interface controller (NIC) teaming comprising:
   providing a plurality of classes to represent at least one attribute of a NIC team, the NIC team configured to provide load balancing, wherein the NIC team comprises NICs from multiple vendors;
   providing at least one association class to represent the relationship between each of the plurality of classes; and
   associating each of the plurality of classes with the at least one association class.

2. The method of claim 1, wherein the at least one attribute of a NIC team may comprise a property, a method, a policy or combinations of two or more thereof.

3. The method of claim 2, wherein the property is selected from the group consisting of name, identifier (ID), team address, team members, teaming mode, operating system, advanced features support, advanced features enable status and combinations of two or more thereof.

4. The method of claim 2, wherein the method is selected from the group consisting of creating a team, deleting a team, setting teaming mode, changing teaming mode, getting team statistics, setting team advanced features and combinations of two or more thereof.

5. The method of claim 2, wherein the policy is selected from the group consisting of balanced load, priority based load and other load balance algorithm.

6. The method of claim 1, wherein the association class may comprise the creation of a NIC team.

7. A data structure embodied in a computer-readable medium, the data structure comprising:
   a first field comprising data representing a property and a method for a NIC team, the NIC team configured to provide load balancing, wherein the NIC team comprises NICs from multiple vendors;
   a second field comprising data representing a policy for the NIC team of the first field;
   a third field comprising data representing an association class for creating the NIC team of the first field; and
   a fourth field comprising data representing a relationship between the first and second fields.

8. The data structure of claim 7, wherein the property for the NIC team is selected from the group consisting of name, identifier (ID), team address, team members, teaming mode, operating system, advanced features support, advanced features enable status and combinations of two or more thereof.

9. The data structure of claim 7, wherein the method for the NIC team is selected from the group consisting of creating a team, deleting a team, setting teaming mode, changing teaming mode, getting team statistics, setting team advanced features and combinations of two or more thereof.

10. The data structure of claim 7, wherein the policy for the NIC team is selected from the group consisting of balanced load, priority based load and other load balance algorithm.

11. The data structure of claim 7, wherein the association class for creating the NIC team is selected from the group consisting of adding a team member and removing a team member.

12. The data structure of claim 7, wherein the relationship between the first and second set of fields is an association.

13. The data structure of claim 7, wherein the association between the first and second set of fields is the association selected from a group consisting of applying a policy to the NIC team and removing a policy from the NIC team.

* * * * *